June 13, 1972   J. M. GRANT ET AL   3,669,550
COORDINATE DETECTOR
Filed March 23, 1970   3 Sheets-Sheet 1

INVENTORS
JOHN M. GRANT.
ALBERT D. STOLZY.
BY
ATTORNEY

INVENTOR.
JOHN M. GRANT
ALBERT D. STOLZY
BY
ATTORNEY.

INVENTORS
JOHN M. GRANT
ALBERT D. STOLZY
BY
ATTORNEY.

United States Patent Office 3,669,550
Patented June 13, 1972

3,669,550
COORDINATE DETECTOR
John M. Grant, Granada Hills, and Albert D. Stolzy, Sherman Oaks, Calif., assignors to International Telephone and Telegraph Corporation, New York, N.Y.
Filed Mar. 23, 1970, Ser. No. 21,651
Int. Cl. G01b *11/26;* H01j *39/12*
U.S. Cl. 356—152
13 Claims

ABSTRACT OF THE DISCLOSURE

Apparatus to detect the Cartesian or angular coordinates of an object having a different chromaticity or light intensity than its background so as to make its discernment possible. An electron multiplier is employed which has columns and rows of holes in a dielectric. The holes have surfaces which support secondary emission. The coordinates of the object are thus determined by detecting which hole is flooded or denied electrons from a photocathode due to the existence of the object.

BACKGROUND OF THE INVENTION

This invention relates to object location apparatus and, more particularly, to an optical system for detecting the position of an object distinguishable from its background by its intensity or chromaticity.

In the past, solid state image detectors have had some instability in various environments and have had a rather low gain.

SUMMARY OF THE INVENTION

In accordance with the device of the present invention, the above-described and other disadvantages of the prior art are overcome by providing a dielectric body having holes therethrough. These holes have surfaces capable of supporting secondary electron emission and extend from openings on one side of the dielectric body to openings on the other side. These openings are arranged in rows and columns. A plurality of first conductors are connected to the ends of the hole surfaces at one side of the dielectric body, each first conductor being connected to all the hole surfaces in a corresponding row. A plurality of second conductors are connected to the ends of the hole surfaces at the other side of the dielectric body, each second conductor being connected to all the hole surfaces in a corresponding column. Each first conductor has only one corresponding row, and each second conductor has only one corresponding column.

A photocathode floods the holes with electrons depending upon the amount of light emanating from an object in the field of view. Thus, one hole gets most of the electrons. This hole is detected and its position is indicative of the Cartesian or angular coordinates of the object.

The device of the present invention, in several areas, operates as well as or superior to all prior art devices. These areas are size, resolution, noise, and durability. On the other hand, the invention has greater stability and gain than all comparable prior art devices.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

In recent years, considerable attention has been devoted to the electron multiplying properties of long channels made of glass or other low conductance material. Some examples are: U.S. Pat. No. 2,931,914 issued on Apr. 5, 1969, entitled "Electron Multiplier Mosaics," by Richard K. Orthuber, "Noise Problems in Continuous Channel Multipliers" given by John M. Grant at the 1961 Symposium on Image Intensification, sponsored jointly by NASA and the U.S. Army Engineer Research and Development Laboratory, and "Continuous Channel Electron Multiplier" by G. W. Goodrich and W. C. Wiley, The Review of Scientific Instruments, vol. 33, No. 7, July 1962. The devices described in the aforementioned references are called "continuous channel multipliers" (CCM).

Figure 1:
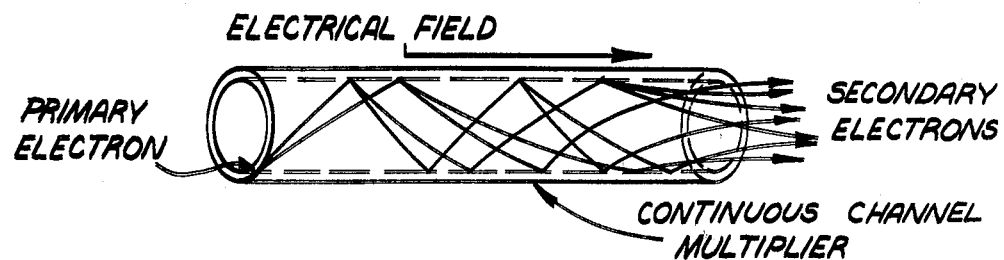
FIG. 1 is a perspective view of a continuous channel multiplier employed with the present invention.

The basic operation of a CCM is as follows. A primary electron entering the channel and impacting with the channel wall will release secondary electrons. If an electric field is directed along the axis of the channel, these secondaries will then be accelerated into the channel (see FIG. 1). As the secondaries will generally have some initial velocity normal to the channel wall, they will eventually cross the channel and bombard the channel wall again releasing more secondaries. The process continues repeatedly until all of the electrons escape the channel. If the interior wall of the channel is coated with or treated to have a good secondary emitter, this process can lead to a substantial electron gain.

Saturation due to wall charging at high gains and by the noise which can result from the widely different electron trajectories within the channel can be undesirably created. Both of these problems can be treated successfully. The saturation problem can be alleviated by depositing a semiconducting film on the interior of the channel wall. Semiconducting films which do not alter the secondary emission properties of the channel wall or which are good secondary emitters in themselves are needed if they are used.

Figure 2:
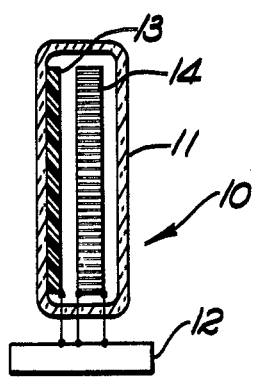
FIG. 2 is a vertical sectional view of a light receiving tube employed with the present invention.

In FIG. 2, the system of the present invention is indicated at 10, including a glass evacuated envelope 11 and circuit means 12. Envelope 11 has a conventional photocathode 13 therein fixed to envelope 11 in a conventional manner. An electron multiplier 14 is supported in envelope 11 in a conventional manner. However, multiplier 14 is specially constructed in accordance with the present invention.

Figure 3:
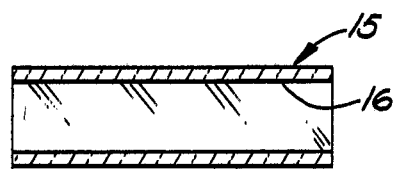
FIG. 3 is a longitudinal sectional view of a continuous channel multiplier.
Figure 4:
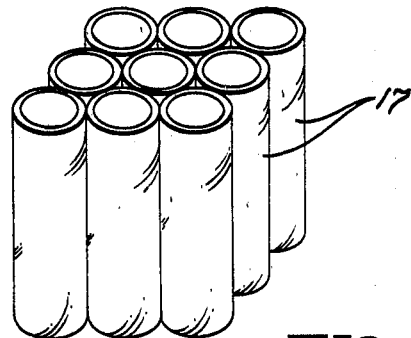
FIG. 4 is a perspective view of a plurality of continuous channel multipliers.

Multiplier 14, if desired, may be consrtucted of a solid glass plate having holes therethrough, with electrodes evaporated thereon in a manner to be described. Alternatively, CCM's may be used of the type shown in FIG. 3. A CCM 15 is shown in FIG. 3 having a cylindrical internal surface 16 which will support secondary emission. Electrodes are evaporated on to the end of the tube. However, in order to make an entire multiplier 14, a great many tubes such as tube 15 must be employed in positions indicated at 17 in FIG. 4. That is, the tubes 17 have holes at opposite ends which lie in columns or rows.

Figure 5:
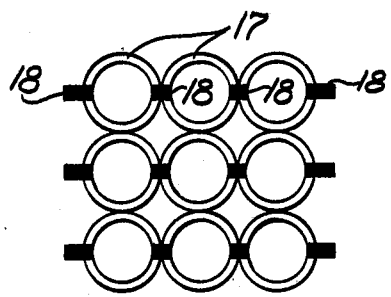
FIG. 5 is a front elevational view of a portion of an electron multiplier employed with the present invention.

As shown in FIG. 5, electrical contact is made between the ends of the internal surfaces of tubes 17 in each particular row. That is, all of the ends in a particular row are electrically connected to one conductor. The electrically conducting segments are indicated at 18. Strips 18 may be made of gold or any other suitable conductor.

Figure 6:
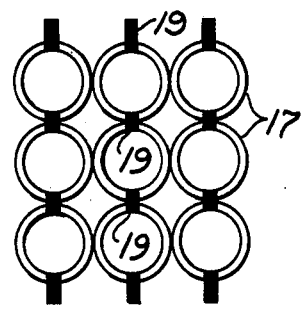
FIG. 6 is a rear elevational view of the multiplier shown in FIG. 5.

As shown in FIG. 6, conductive strips 19 connect the ends of the secondary emissive interior surface of all of the tubes 17 in one column.

Figure 7:
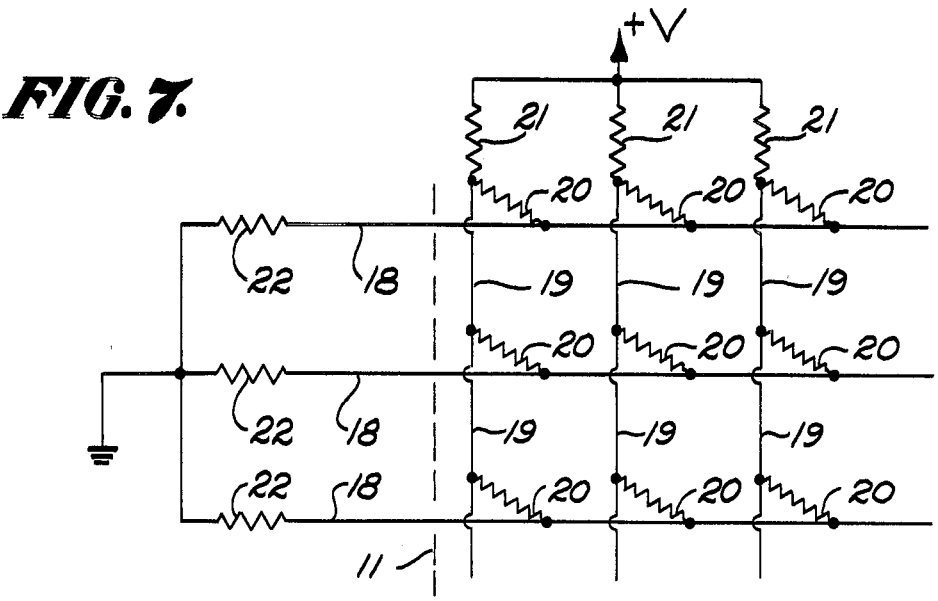
FIG. 7 is a schematic diagram of a portion of the multiplier circuit.

In FIG. 7, each resistance of the surface of the holes is indicated at 20. Conductors 18 and 19 are indicated by lines. The envelope 11 is indicated by the same number. Note will be taken that outside envelope 11, a resistor 21 is connected to each conductor 19 and a resistor 22 is connected to each conductor 18. One end of each resistor 22 is connected to ground. One end of each resistor 21 is connected to a positive source of potential.

It will be noted that in FIG. 7, multiplier 14 is like a matrix. The operation of the matrix is as follows. In the absence of any electron multiplication, the impedance of a resistance 20 will be just that of the semiconducting layer. The value of all of the resistors 20 will depend upon the gain desired. Generally, it will range from $10^{13}$ to $10^{16}$ ohms. In this instance, the potential applied to the channels may also be any value depending on the gain requirements. However, generally, the voltage applied to resistors 21 will be 1,000 volts. Typically, with 100 channels per conducting strip, the current from the resistors 21 and 22 will be of the order of $10^{-8}$ to $10^{-11}$ amperes.

When primary electrons enter one of the channels and multiplication occurs, the effective impedance of the channel drops and a voltage rise appears across one corresponding resistor 21 in that group and one corresponding resistor 22 in that group.

In accordance with the foregoing, all that has to be done to detect the location of a subject is to detect which one of the resistors 21 and 22 is conducting more current that the rest. In this manner, it is possible to detect the location of a star in a dark sky, the tail exhaust of a jet in a night sky, any other source of illumination in a dark background, and a dark object in a light background. A light reflecting object may also be detected on a dark background. A light absorbing subject may also be detected on a light background. By the use of chromatic filters, it is also possible to distinguish objects based on their chromaticity where a filter will either pass or reflect visible or invisible light in certain wave lengths. This arrangement is to be distinguished somewhat from the conventional arrangement where the location of a subject is detected primarily on the basis of its different radiation or reflectivity from the background.

Figure 8:
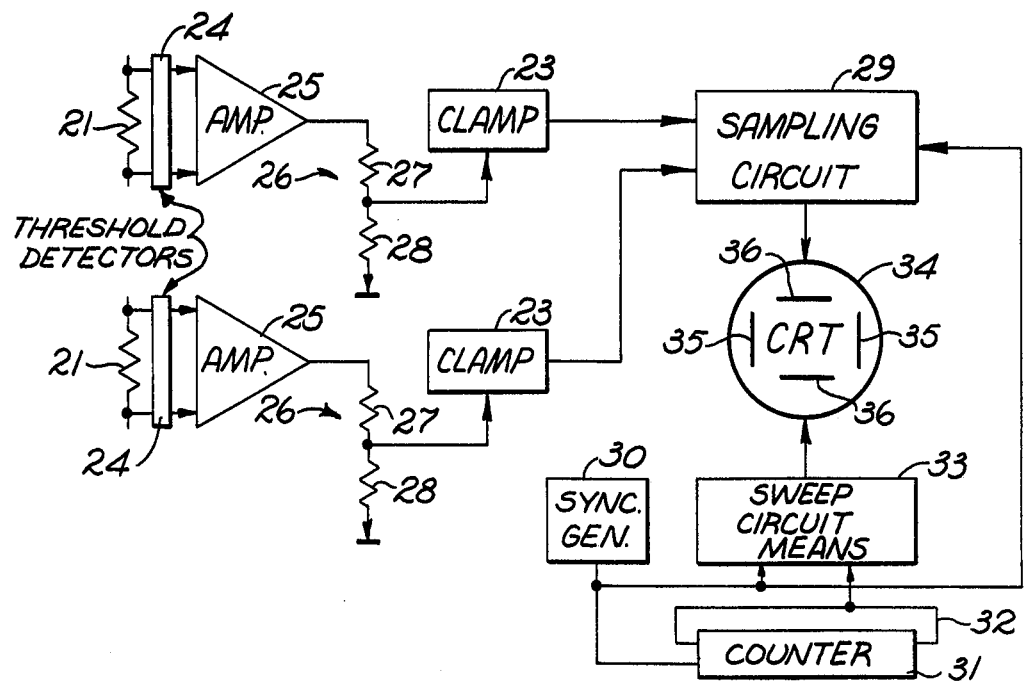
FIGS. 8 and 9 are schematic diagrams of systems displaying information derived from the tube shown in FIG. 2.
Figure 9:
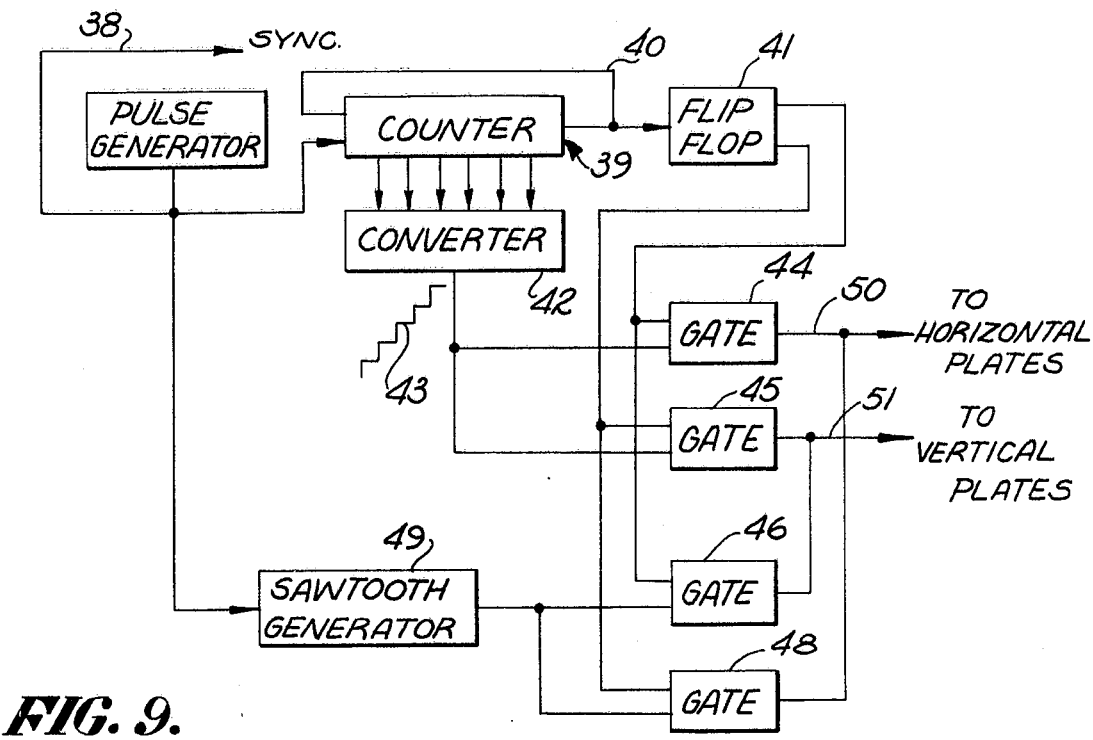

Once the information is obtained in the form of the increase of current in one of the resistors 21 and one of the resistors 22, how may it be displayed? Two such arrangements are shown in FIGS. 8 and 9. In FIG. 8, each resistor 21 is connected to a clamp 23 through a threshold detector 24, an amplifier 25, and a level shifting circuit 26. Each level shifting circuit 26 includes resistors 27 and 28 which act as a conventionally biased voltage divider. A sampling circuit 29 samples the output of each clamp 23 in succession. Sampling circuit 29 samples at a rate determined by the regular pulse output of a sync generator 30. Sync generator 30 operates counter 31 which cycles and is reset on a lead 32 from its output at a frequency the same cycle of sampling circuit 29. That is, when the last clamp 23 is sampled and counter 31 has reached its maximum count, it is reset by pulse input from generator 30. The reset pulse from counter 31 is supplied to sweep circuit means 33 from an input from generator 30. Means 33 includes a conventional vertical and horizontal sawtooth sweep circuits for a cathode ray tube 34. Cathode ray tube 34 has horizontal deflection plates 35 and vertical deflection plates 36. The output from the horizontal and vertical sweep circuits in means 33 may be reversed without any loss of information. However, the operation of the device shown in FIG. 8 will be described assuming that the horizontal sweep frequency is synchronous with the output of generator 30, and the vertical sweep frequency is synchronous with the reset output pulses of counter 31.

In the operation of the display arrangement shown in FIG. 8, the electron beam of tube 34 is cut off at all times until a target is reached. During the time that tube 34 is cut off, means 33 tends to sweep the electron beam of tube 34 in a raster type scan since the horizonta sweep is faster than the vertical sweep. The tube sweep may then start from the top or bottom and proceed toward the opposite side. For example, the scan may be begun at the top and the beam will be scanned across. The next horizontal line scanned will be below the first and so on. Preferably, one line is scanned horizontally for and in correspondence to each conductor 18. Moreover, the scanning of each line is preferably synchronous with the operation of sampling circuit 29 sampling the output of a particular clamp 23.

When a target is eventually acquired, sampling circuit 29 will illuminate a horizontal line on tube 34 in a position proportional to the Cartesian or angular coordinate of the target. An arrangement identical to that may be employed to indicate the vertical position of a target.

An arrangement for displaying both the horizontal and vertical locations of a target substantially simultaneously on the same cathode-ray tube is shown in FIG. 9. A pulse generator identical to sync generator 30 is indicated at 37. Pulse generator 37 supplies an input to a sampling circuit over a lead 38. In this case, the sampling circuit first samples clamps corresponding to resistors 22 and the clamps corresponding to resistors 21. As before, generator 37 operates a counter 39 having a reset output 40. In this case, counter 39 counts only one-half the cycle of the sampling circuit. The reset output of counter 39 is impressed upon a flip-flop 39. A digital-to-analog converter 42 produces a staircase voltage 43 responsive to the count in the counter 39. First, second, third, and fourth gates 44, 45, 46, and 47 receive various inputs and supply outputs to the cathode-ray tube deflection plates. Pulse generator 37 operates a sawtooth generator 39. Sawtooth generator 39 supplies inputs to gates 46 and 48. Converter 42 supplies staircase voltage 43 to gates 44 and 45. Gates 44 and 46 are gated on simultaneously while gates 49 and 48 are gated off. The converse is also true. The outputs of flip-flop 41 provide on-off controls for the gates. The staircase voltage 43 is either supplied to the cathode-ray tube horizontal deflection plates via a lead 50 while the output of sawtooth generator 39 is supplied to the vertical plates 51 or vice versa.

In the operation of the system shown in FIG. 9, a raster scan takes place as in FIG. 8 for one-half of a sampling cycle. That is, a horizontal line is produced to indicate the vertical position of the target. During the second half cycle, a vertical line is displayed to indicate the horizontal position of the target.

Figure 10:
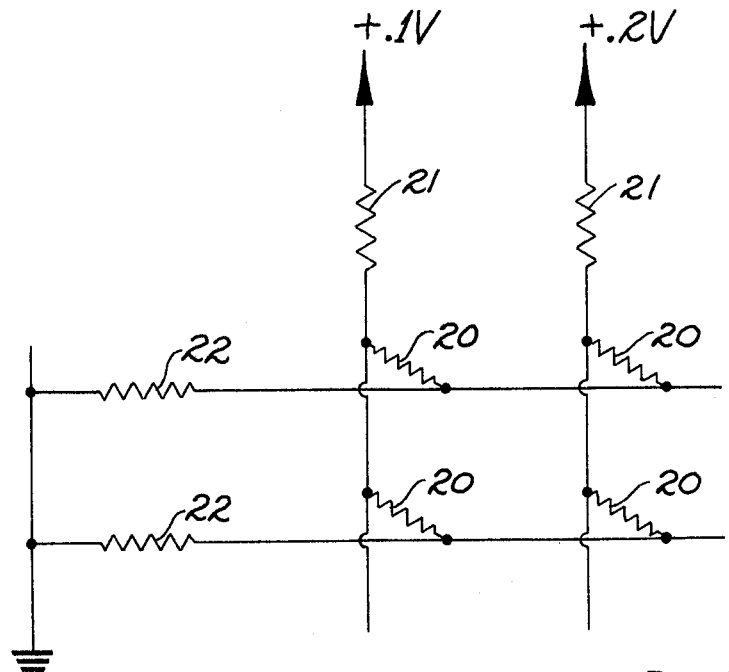
FIG. 10 is a schematic diagram of an alternative embodiment of the invention.

As shown in FIG. 10, the voltages on resistors 21 may be different. Thus, by the use of comparators and coincidence circuits, it is possible to detect more than one target. If desired, each resistor 21 may be at different potentials. All of the resistors 21 and 22 may also have different voltages. The resistances 20 may also be different. They may be changed by varying the length of the CCM's, by varying the secondary emission ratio, and by varying the saturation levels.

Note will be taken that the CCM's may be hexagonal rather than cylindrical, if desired. Amplifier 25 shown in FIG. 8 may be regenerative, if desired.

What is claimed is:

1. A coordinate detector comprising: a dielectric body having holes therethrough, said holes having surfaces capable of supporting secondary electron emission, said holes extending from openings on one side of said body to openings on the other side thereof, said openings being arranged in rows and columns; a plurality of first conductors connected to the ends of said hole surfaces at said one side of said body, each said first conductor being connected to all the hole surfaces in a corresponding row; and a plurality of second conductors connected to the ends of said hole surfaces at said other side of said body, each said second conductor being connected to all the hole surfaces in a corresponding column, each of said first conductors having only one corresponding row, each of said second conductors having only one corresponding column.

2. The invention as defined in claim 1, wherein a first resistor is connected from each said first conductor to a first common junction, a second resistor is connected from each said second conductor to a common second junction, an evacuated envelope surrounding said body and all of said conductors, a photocathode on said one side of said body to supply primary electrons thereto, means to maintain said photocathode, and first and second junctions at predetermined potentials, the potential of said first junction being more positive than that of said photocathode, the potential of said second junction being more positive than that of said first junction.

3. The invention as defined in claim 2, wherein sensor means are provided to produce a plurality of output signals corresponding to an increase in current in corresponding resistors connected from said first conductors, an indicator having a movable indicating device, means to sample the output of said sensor means in synchronism with movement of said device, and means to gate said device on when one of said signals is sampled.

4. The invention as defined in claim 3, wherein said indicator is a cathode-ray tube having an electron beam, and means to provide a sawtooth deflection to said beam in one direction at the sampling rate, and to provide one orthogonal sawtooth deflection for each sampling cycle.

5. The invention as defined in claim 2, wherein a cathode-ray tube is provided, said tube having an electron beam and horizontal and vertical deflection plates, a sampler connected to sample the voltage across each first conductor resistor in succession, and then to sample the voltage across each second conductor resistor in succession, said sampler being adapted to gate said tube beam on when said resistor voltages are above a predetermined minimum, a pulse generator to actuate said sampler synchronously therewith, a pulse counter having a reset output in synchronism with the cycle of said sampler, said pulse counter being connected from said pulse generator, a flip-flop, a digital-to-analog converter connected from said counter to produce a staircase voltage, first, second, third, and fourth gates connected from said flip-flop to be opened and closely thereby, said first and third gates being opened and closed synchronously, said second and fourth gates both being opened when said first and third gates are closed, and vice versa, said flip-flop being connected from said counter to have its state changed by said counter on reset of said counter, said converter being connected to said first and second gates, a sawtooth generator connected from said pulse generator to said third and fourth gates, the outputs of said first and fourth gates being connected to said horizontal deflection plates, the outputs of said second and third gates being connected to said vertical deflection plates.

6. The invention as defined in claim 1, wherein a plurality of first resistors each have one end connected to a corresponding one of said first conductors, a plurality of second resistors each having one end connected to a corresponding one of said second conductors.

7. The invention as defined in claim 6, wherein all of said resistors have the same resistance.

8. The invention as defined in claim 6, including means to maintain said photocathode and the other ends of said resistors at predetermined potentials.

9. The invention as defined in claim 8, wherein the other ends of said first resistors are all maintained at the same positive potential with respect to said photocathode, the other ends of said second resistors all being maintained at the same positive potential with respect to said other ends of said first resistors.

10. The invention as defined in claim 8, wherein said other ends of said first resistors are maintained at different potentials.

11. The invention as defined in claim 10, wherein the other ends of said second resistors are maintained at different potentials.

12. The invention as defined in claim 8, wherein said first resistors have different resistances.

13. The invention as defined in claim 12, wherein said second resistors have different resistances.

References Cited

UNITED STATES PATENTS

| | | | |
|---|---|---|---|
| 3,553,457 | 1/1971 | Manley | 250—220 M |
| 3,449,582 | 6/1969 | Sackinger | 313—105 |
| 3,581,097 | 5/1971 | Hibi | 250—220 M |

BENJAMIN A. BORCHELT, Primary Examiner

S. BUCZINSKI, Assistant Examiner

U.S. Cl. X.R.

250—207, 213 R, 213 VT, 220 M; 313—103, 105; 315—24